(12) United States Patent
Secatch et al.

(10) Patent No.: US 11,994,950 B2
(45) Date of Patent: May 28, 2024

(54) SECONDARY KEY ALLOCATION TO STORAGE DRIVE FAILURE DOMAINS

(71) Applicant: Seagate Technology LLC, Fremont, CA (US)

(72) Inventors: Stacey Secatch, Niwot, CO (US); Mark A. Gaertner, St. Paul, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 184 days.

(21) Appl. No.: 17/564,078

(22) Filed: Dec. 28, 2021

(65) Prior Publication Data

US 2023/0205633 A1    Jun. 29, 2023

(51) Int. Cl.
*G06F 11/00* (2006.01)
*G06F 11/10* (2006.01)
*G06F 21/60* (2013.01)
*H04L 9/14* (2006.01)

(52) U.S. Cl.
CPC ........ *G06F 11/1092* (2013.01); *G06F 21/602* (2013.01); *H04L 9/14* (2013.01)

(58) Field of Classification Search
CPC .... G06F 21/80; G06F 21/805; G06F 11/1088; G06F 11/1092; G06F 11/1096
See application file for complete search history.

(56) References Cited

U.S. PATENT DOCUMENTS

| | | | |
|---|---|---|---|
| 9,384,777 B2 | 7/2016 | Carlson et al. | |
| 9,680,651 B2 | 6/2017 | Anderson | |
| 2004/0260967 A1* | 12/2004 | Guha | G06F 11/008 714/E11.02 |
| 2005/0262385 A1* | 11/2005 | McNeill | G06F 11/008 714/E11.02 |
| 2014/0101455 A1* | 4/2014 | Bauman | G06F 21/80 713/189 |
| 2017/0131945 A1 | 5/2017 | Griffes et al. | |
| 2019/0058583 A1 | 2/2019 | Canepa et al. | |
| 2019/0158281 A1 | 5/2019 | Han | |

OTHER PUBLICATIONS

Constellation .2 SAS Product Manual, Seagate Technology LLC, Publication No. 100620418, Rev. K, Apr. 2016 (Year: 2016).*

(Continued)

*Primary Examiner* — Michael Maskulinski
(74) *Attorney, Agent, or Firm* — HOLZER PATEL DRENNAN (57) ABSTRACT

Failure-domain-specific cryptographic keys for use in control of access to data within failure domains of a storage drive. A unique failure domain-specific cryptographic key may be associated with each of a plurality of failure domains in a storage drive. The failure domains may correspond to any portion of the storage media of a drive that is susceptible to failure while leaving other portions of the storage drive functional. In turn, upon detection of a condition associated with a failure (e.g., an actual or predicted failure) of a failure domain, the associated failure domain-specific cryptographic key may be deleted to preclude further access to data in the failed failure domain. Deletion of the failure domain-specific cryptographic key may be before or after data in the failed failure domain is rebuilt in another portion of a storage drive that is functional.

20 Claims, 9 Drawing Sheets

(56) References Cited

OTHER PUBLICATIONS

Khouzani et al., "Architecting Data Placement in SSDs for Efficient Secure Deletion Implementation," 2018 IEEE/ACM International Conference on Computer-Aided Design (ICCAD), San Diego, CA, USA, 2018, pp. 1-6 (Year: 2018).*

Liu et al., "ErasuCrypto: A Light-weight Secure Data Deletion Scheme for Solid State Drives." Proc. Priv. Enhancing Technol. 2017, pp. 132-148. (Year: 2017).*

* cited by examiner

SECONDARY KEY ALLOCATION TO STORAGE DRIVE FAILURE DOMAINS

BACKGROUND

Storage drives are common in modern computing. In addition, ever increasing storage capacity will be needed to provide storage for the increased amounts of data generated in the digital age. However, drive failures continue to present difficulties when managing data storage drives. Particularly in view of advanced manufacturing techniques to provide increased aerial storage density (e.g. including use of heat assisted magnetic recording or other approaches), physical failures of storage drives continue to represent a problem that must be addressed. For instance, one known failure mechanism includes head failure in which a write head or a read ahead of a magnetic storage device fails such that the magnetic media accessed by the failed head may no longer be fully functional.

SUMMARY

In view of the foregoing, the present disclosure generally relates to use of a secondary cryptographic keys that are each specifically and uniquely associated with a corresponding failure domain of a storage drive. Cryptographic keys that are uniquely associated with failure domains of a storage drive may be utilized in addition to root keys or other associated cryptographic keys with the drive. However, because the failure domain-specific keys may be individually deleted, use of the failure domain-specific cryptographic keys provides greater granularity for controlling access to data on a storage drive. For instance, in the event of a failure within a given failure domain, the corresponding cryptographic key uniquely associated with the failure domain may be deleted, thus preventing access to data within the failure domain even if the storage drive remains in service using other portions of the drive unaffected by the failure.

Accordingly, upon detection of a condition within a storage drive related to a failure of the drive, the storage drive may undergo a remanufacturing process to move and/or rebuild data from a given failure domain of the drive. In connection with the remanufacturing process, the failure domain specific cryptographic key for the failed failure domain may be deleted, thereby removing access to legacy data existing within the failure domain. In turn, security vulnerabilities and other concerns associated with legacy data remaining in the failure domain of the storage drive at the completion of the remanufacture process may be reduced or eliminated entirely.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Storage drives facilitate persistent storage of data and are common in modern computing. However, storage drives are subject to failures in which a portion, but not all, of the storage capacity of the storage drive may become non-functioning. By non-functioning, at least a portion of the functionality of the failed portion of the storage drive may become unavailable. As an example, a write head for a magnetic storage drive may fail. While read functionality via a read head may still be available such that the failed portion may remain in a read-only state, the portion of the drive that utilizes the failed write head may become non-functioning in view of the failure of the write head.

Because a failed portion of a storage drive may represent a fraction of the overall capacity of the drive, discarding or replacing the entire storage drive upon a failure of only a portion of the drive is disadvantageous and may be economically or operationally infeasible. In turn, a remanufacture processes may be utilized upon failure of a portion of a storage drive. In a remanufacture process, a storage drive may be reconfigured such the failed portion of the storage drive is decommissioned, thus allowing the remaining functional portions of the storage drive to be utilized.

The remanufacture process for storage drives generally requires reconfiguration of the drive for reuse after reconfiguration of the storage drive. Once remanufactured, the reconfigured storage drive may be used with a reduced capacity. One such remanufacture approach is an "off-line remanufacture" process. In an off-line remanufacture process, a storage drive is taken off-line (e.g., the entire drive is taken out of service). Once off-line, the entire drive is reconfigured such that, for example, metadata management, drive tables, and stored data are rebuilt into functional portions of the drive. In this process, data may be moved to another storage drive or may be restored on the reconfigured drive (e.g., using newly created keys for the reconfigured drive). In turn, the failed portion of the drive is decommissioned and the reconfigured drive may be put back into service without use of the failed portion of the drive. The capacity of the drive may be reduced in relation to the size of the failed portion of the drive. In such an off-line remanufacture, a new root key for the drive may be produced and the old root key may be deleted such that any remaining data in the failed portion of the drive is invalidated as it may no longer be accessible without the old root key. Provision of a new root key may require all data previously stored on the drive to be reconfigured for storage using the new key.

In another approach, "on-line remanufacture" or "data-safe" remanufacture may be provided. In this approach, the failed portion of the storage drive may be converted to read-only access while providing continued full read/write access to the remaining, fully functional portions of the drive. In a data-safe remanufacture process, the storage drive may remain on-line and in service during the remanufacture process. The data-safe remanufacture process allows data from the failed portion of the drive to be rebuilt as need using the read-only access to the failed portion to rebuild and/or move data from the failed portion of the storage drive. In this approach, the root encryption key for the drive may remain valid and active during the rebuilding process.

Accordingly, the data-safe remanufacture process provides the advantage that the storage drive may be remanufactured while the drive remains in service without requiring a new root key to be used. However, it may not be possible to overwrite data on a failed portion of a drive given that the write head may be the failed portion. Furthermore, as the root key remains active in the data-safe remanufacture process, data in the failed portion of the drive may continue to be accessible even upon completion of the remanufacture process. In turn, data on the failed portion may still be accessible and that data may be subject to security vulnerabilities (e.g., leakage) after the drive has undergone the data-safe remanufactured process.

In view of the foregoing, it may be appreciated that the continued accessibility of data in a failed portion of the drive presents drawbacks and potential vulnerabilities. Accordingly, rendering data within a failed portion of a drive inaccessible would be desirable either before or after a data-safe remanufacture operation. However, traditional approaches have only provided control over access to data at a drive level. For instance, rendering data in a drive inaccessible has traditionally required deletion of a root key for the drive such that all data in the drive becomes inaccessible including data in the portions that are still functional. Further still, use of new root keys with rebuilt data may require all data in the drive to be reconfigured using new root keys such as in the case of an off-line remanufacture, which may require additional time and/or computational overhead to complete.

As such, the present disclosure generally relates to approaches in which a cryptographic key is uniquely associated a failure domain of a storage drive. In this regard, a plurality of cryptographic keys may be provided that are each uniquely associated with one of a plurality of failure domains in a storage drive. In turn, upon a detected condition related to failure of a failure domain, the cryptographic key associated with a suspect or failed failure domain may be deleted. In turn, functional portions of the storage drive may continue to operate without interruption using an original (i.e., unmodified) root key and the other respective failure domain-specific keys. This approach provides more granular control to depopulate failed portions of a drive without interrupting operation of the remaining portions of the storage drive. As will be described in greater detail below, use of failure domain-specific cryptographic keys may allow data within a failed failure domain to be rendered inaccessible.

In other examples, additional measures may be used to render data inaccessible in a failed portion of a drive. For example, a fuse could be used for the now read-only head to ensure that the surface under the bad head is longer accessible after the host has completed a remanufacture operation.

Figure 1:
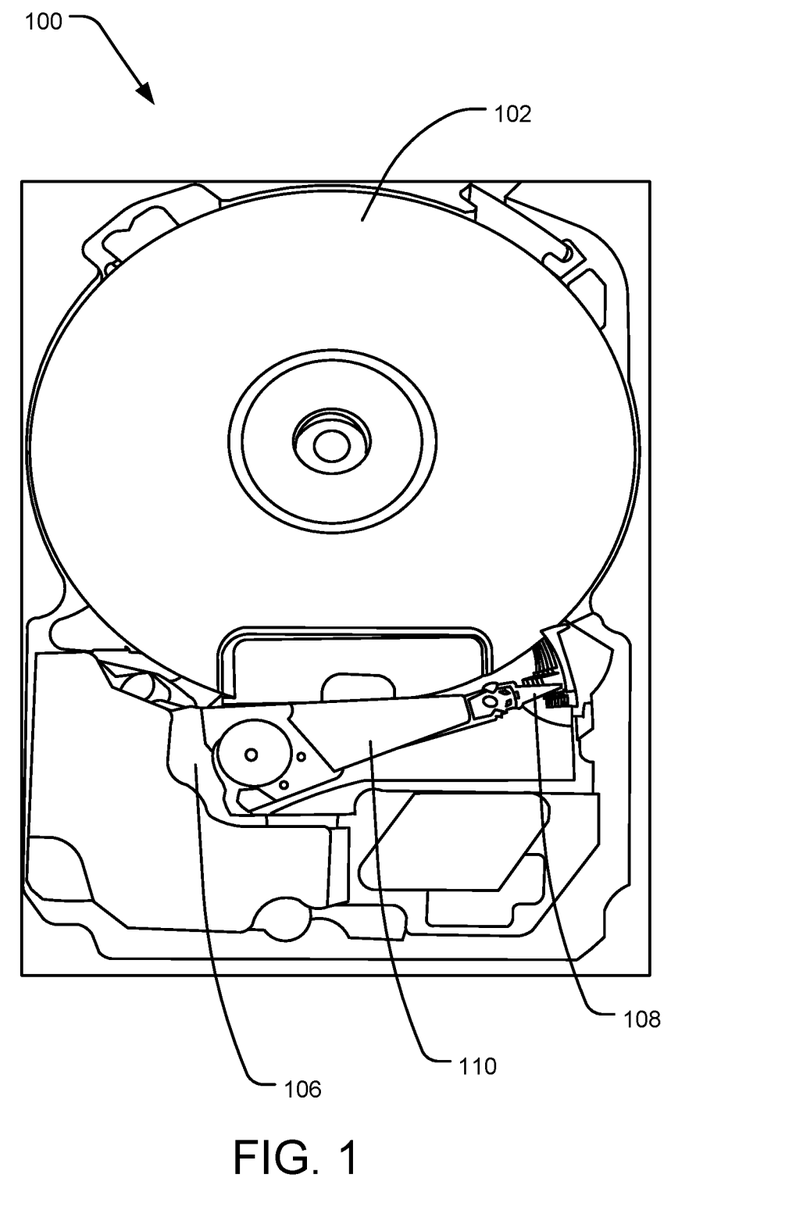
FIG. 1 illustrates an example hard disk drive architecture with which the present disclosure may be used.

Drive failures may include a number of different failure modalities which may affect different portions of a storage drive. In one example, the storage drive may be a magnetic storage drive such as a hard disk drive (HDD). With further reference to FIG. 1, an example of a typical HDD 100 is illustrated. The HDD 100 includes magnetic storage media comprising disks or "platters" 102. The platters 102 generally comprise disks rotated by a spindle motor. In turn, one or more heads 108 may be provided on an actuator arm 110 that is movable by an actuator 106 (e.g., a voice coil actuator). In this regard, the actuator 106 may be controlled to position the one or more heads 108 relative to the spinning platters 102 to read or write data to tracks in the platters 102. The platters 102 may include a plurality of media surface (e.g., a top surface and a bottom surface disposed on opposite sides of the platter 102). Separate assemblies comprising an actuator 106, an actuator arm 110, and one or more read heads 108 may be provided for each of the separate surfaces of the platter 102. In a typical HDD 100, the head 108 may actually comprise an assembly that includes a read head and a write head. The read head may be used to read data from the platters 102 whereas the write head is used to write data to the platters 102.

As may be appreciated, a number of physical components are utilized in a HDD in order to effectuate reading and writing of data from the platters 102. Such physical components may each be subject to the potential for physical failure that renders portions of the drive nonfunctional. In this regard, a plurality of failure domains exist within the HDD 100 that may be associated with different physical failure modalities of components within the HDD 100. Such failure domains may include different levels of failure domains that may affect different portions of the overall storage capacity of the HDD 100. For example, failure of a write head may render all or a portion of one of the surfaces of the platter 102 nonfunctional as data may no longer be capable of being written to that surface. However, the other surface of the platter and other platters in the HDD 100 may be unaffected such that the remainder of the platter surfaces in the HDD 100 may be continued to be accessible. In another example, an actuator 106 may fail such that all platter surfaces that are read and written using the actuator 106 may be affected. Upon failure of an actuator, a plurality of heads associated with a plurality of platter surfaces may be affected. Other failure domains may also be defined within the drive without limitation.

Further still, while described in the context of a physical failure of a HDD, it may be appreciated that other storage drives may also include failure domains. For example, solid state memory devices may be subject to failures that affect a portion, but not all, storage resources in the drive. In this regard, pages, blocks, dies, or other portion of a solid-state drive may each comprise failure domains such that a failure within any given domain may render a portion, but not all, of the storage drive nonfunctional.

Accordingly, for purposes of the present application a failure domain refers to any portion of a storage drive susceptible to failure such that other portions of the storage drive remain functional for read and write access of data in the storage drive. That is, failure domains may be provided in magnetic storage media (e.g., HDDs), solid state storage media, or any other type of storage drive in which a portion comprising less than an entirety of the storge drive capacity is susceptible to failure. Moreover, failure domains may be present at different levels in a storage drive representing different sizes of storage encompassed within the different levels of failure domains. In this regard, failure domains may be overlapping in that one or more failure domains may be subsumed within a higher-level failure domain that may encompass a plurality of smaller failure domains. One example of different levels of failure domains may include a first failure domain related an actuator of a HDD, which may represent a failure domain that encompasses a plurality of smaller failure domains corresponding to a plurality of heads supported by the actuator. That is, any one of the heads of the actuator may be prone to failure, representing a failure domain that may affect a given surface of a platter. In addition, the actuator may support a plurality of heads that are associated with a plurality of surfaces of media data. Thus, a first level of failure domain may relate to potential failure of the actuator, while a second level of failure domain may relate to a given head supported by the actuator. In this case the first level of failure domain may affect a larger portion of the overall storage capacity of the storage drive than the second-level failure domain. Similarly, a given page of memory may represent a first failure domain and a block of pages may represent a second failure domain that includes a plurality of pages.

While there may be a practical limit to the number of keys that can be maintained for a storage drive, additional failure domain cryptographic keys may help to manage the granularity of deletion. In another example, a failure domain-specific cryptographic key per one or more zones (e.g., shingled magnetic recording (SMR) zones) would allow for fine-grained shredding of the data. Use of SMR zones as failure domains is a particular good fit since data in the zone is already invalidated at one time. This could be accomplished via a command to delete the key for a group of zones. For the case where there is one key per SMR zone, a cryptographic erase could be implemented such that whenever the write pointer is rewound to the beginning of zone, the key for the SMR zone is shredded (e.g., deleted) and a new key is generated. This does require enough entropy in the drive to generate a new drive-based physical key for every zone write pass.

Figure 2:
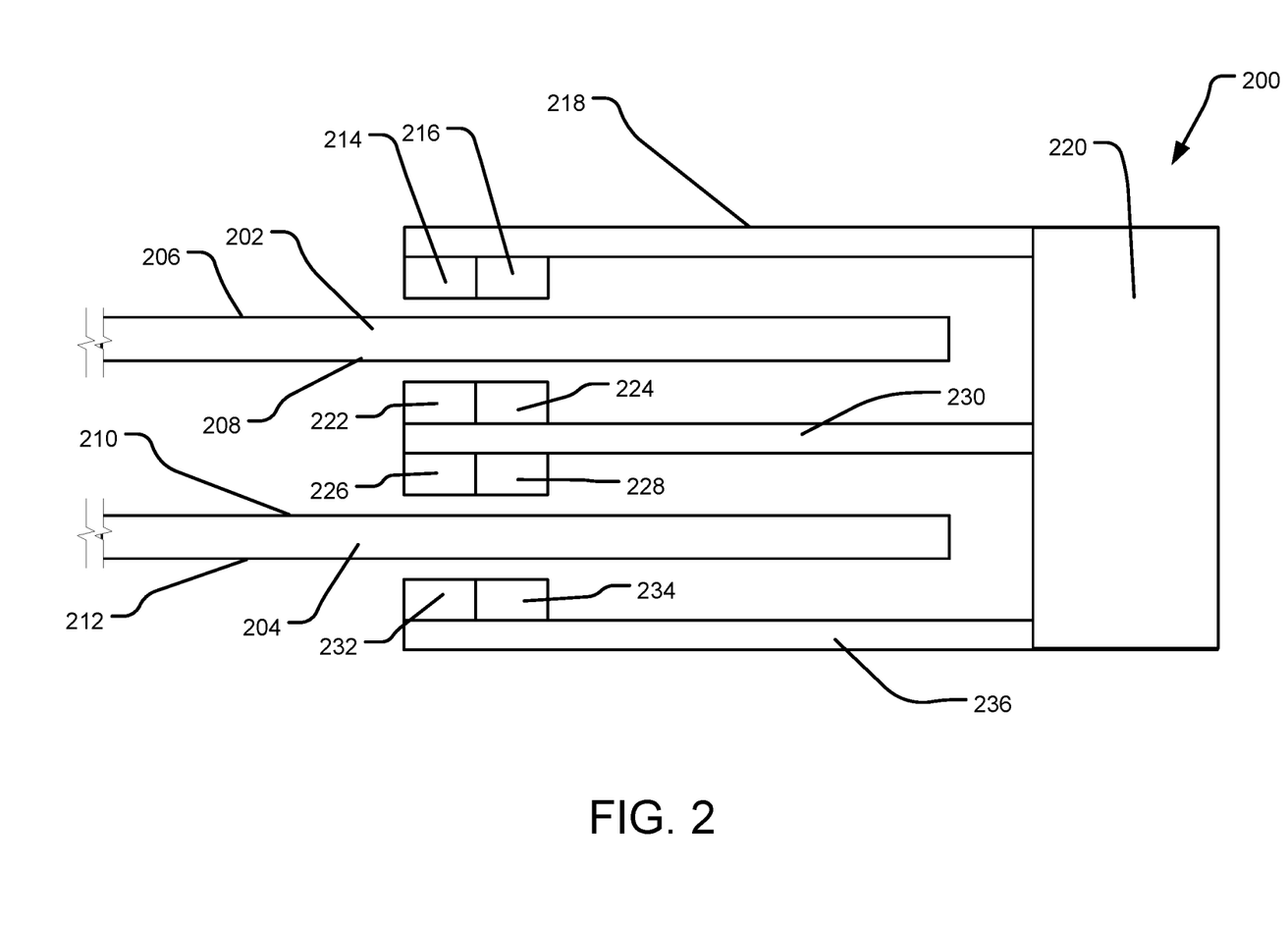
FIG. 2 illustrates an example partial side view of a hard disk drive having a plurality of storage media disks and head assemblies.

With further reference to FIG. 2, a partial side view of an HDD 200 is illustrated. The HDD 200 includes a first disk 202 and a second disk 204. While two disks comprising magnetic media are illustrated in the example shown in FIG. 2, it may be appreciated that fewer or additional portions of media (e.g., fewer or additional disks) may be provided without limitation. The first disk 202 includes a first surface 206 and a second surface 208. The first surface 206 may have data written to the first surface 206 by a write head 216 and data read from the first surface 206 by a read head 214. The read head 214 and the write head 216 may be supported by a first actuator arm 218 that is moveable by an actuator 220. The actuator 220 may be used to move the first actuator arm 218 relative to the first surface 206 to position the read head 214 and write head 216 relative to the first surface 206 to allow for reading and writing of data to the first surface 206.

In addition, the second surface 208 may have data written to the second surface using a write head 224 and may have data read from the second surfacer 208 using a read head 222. The read head 222 and the write head 224 may be supported by a second actuator arm 230. The second actuator arm 230 may be moveable by the actuator 220 independently of the first actuator arm 218 to dispose the read head 222 and write head 224 relative to the second surface 208.

The second disk 204 may include a third surface 210 and a fourth surface 212. The third surface 210 may have data written to the third surface 210 using a write head 226 and data read from the third surface 210 by a read head 228. The read head 226 and the write head 228 may be supported by the second actuator arm 230, which also positions read head 222 and the write head 224.

The fourth surface 212 may have data written to the fourth surface 212 using a write head 234 and data read from the fourth surface 212 using a read head 232. The write head 234 and read head 232 are supported by third actuator arm 236 that is independently controllable by the actuator 220 to dispose the read head 232 and write head 234 relative to the fourth surface 212.

Accordingly, each of the first disk 202 and the second disk 204 may each include independent surfaces that may be written to and read from by different read and write heads, respectively. Accordingly, each surface may correspond to a failure domain that is susceptible to failure of either the corresponding read head or write head used to read data from or write data to the surface. Furthermore, potential failures of the actuator arms may also represent a failure domain. In this regard, some of the failure domains may be overlapping. For example, the first actuator arm 218 supports the read head 214 and write head 216. However, the second actuator arm 230 also supports read head 226 and write head 228. As such, a failure domain associated with the second actuator arm 230 may include two further failure domains related to potential failure of the read head 222 and write head 224 that affects the second surface 208 and a separate failure domain corresponding to the read head 214 and the write head 216 corresponding to the second surface 208

Figure 3:
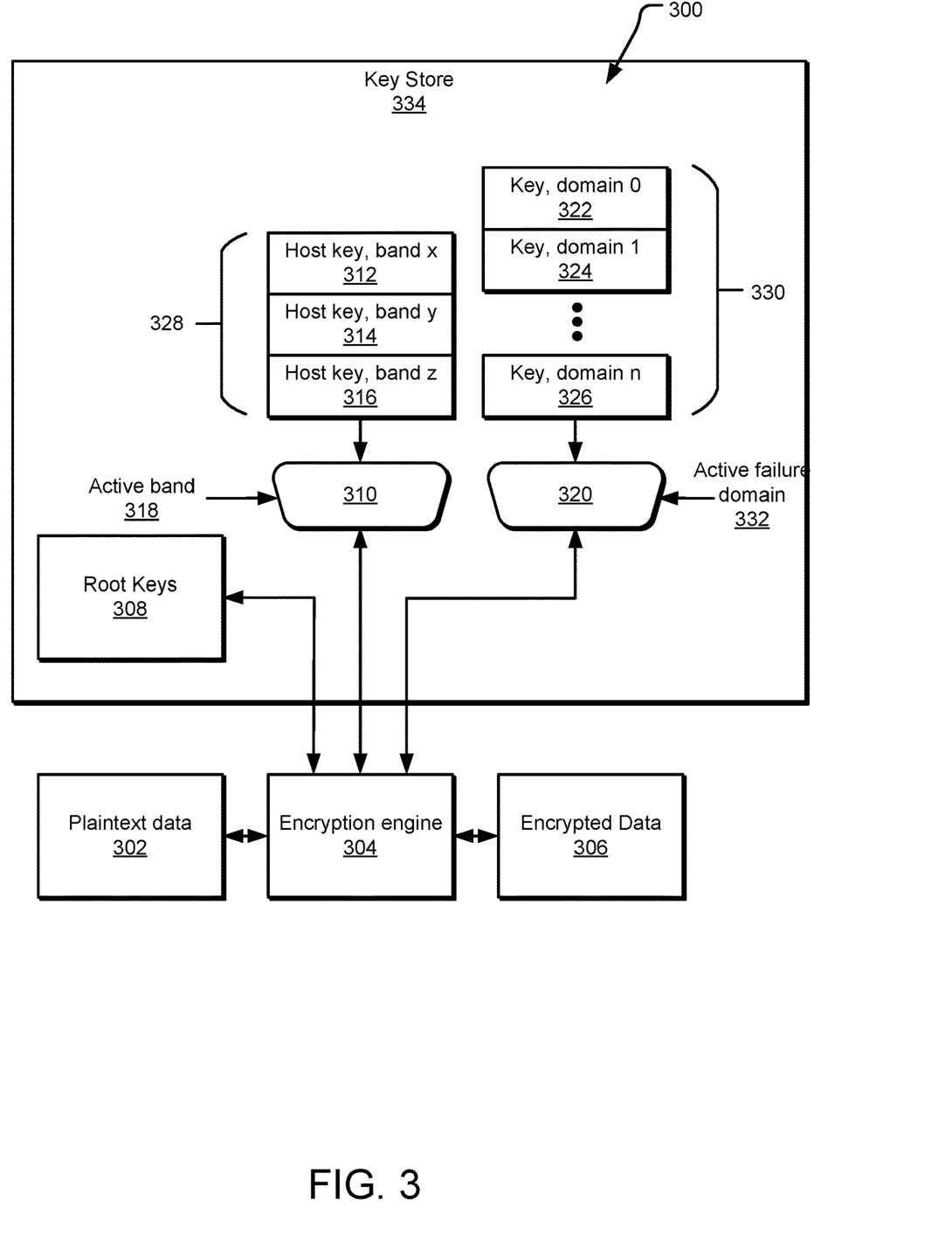
FIG. 3 illustrates an example system comprising an encryption engine with access to failure domain-specific cryptographic keys.

As noted above, the present disclosure relates to use of failure-domain specific cryptographic keys in which respective failure domains may each be associated with a unique cryptographic key. With further reference to FIG. 3, an example of a system 300 is illustrated that includes an encryption engine 304 for encryption of data to be written to and decryption of data read from a storage drive. Accordingly, the encryption engine 304 may be operative to receive plaintext data 302. The encryption engine 304 may encrypt the plaintext data 302 to provide encrypted data 306 (e.g., which may then be written to storage media a storage drive). In addition, encrypted data 306 may be read from a storage drive and decrypted by the encryption engine 304 to provide plaintext data 302.

In this regard, the encryption engine 304 may have access to or otherwise be provided with a plurality of cryptographic keys that may be used to encrypt and/or decrypt data by the encryption engine 304. The cryptographic keys may be provided in a key store 334 accessible by the encryption engine 304. For instance, the encryption engine 304 may obtain one or more root keys 308 to be used for encryption and decryption of data based on the root keys 308. For instance, all data written to or read from a given storage drive may be encrypted and decrypted using the one or more root keys 308. Furthermore, other cryptographic keys may be provided including, for example, a plurality of host keys 328. Specifically, FIG. 3 illustrates a host key for band x 312, a host key for band y 314, and a host key for band z 316. The various host keys 328 may be accessible by a selector 310. The selector 310 may receive an indication of an active band 318 that allows for selection of a corresponding host key 328 for the active band. In turn, the appropriate host key 328 for the active band may be provided to the encryption engine 304 for use in encrypting or decrypting data.

In addition, the plurality of failure domain related cryptographic keys 330 may be provided. The failure domain related cryptographic keys 330 may each be uniquely associated with a corresponding failure domain of a storage drive. In the illustrated example of FIG. 3, n cryptographic keys 330 are provided corresponding to n failure domains of a drive. Thus, the cryptographic keys include a cryptographic key for domain 0 322 and a cryptographic key for domain 1 324. Failure domain related cryptographic keys may be provided through a cryptographic key for domain n 326. A selector 320 may be provided that receives an input regarding an active failure domain 332 associated with a failure domain of the storage drive to which data is to be written or from which data is to be read. In this regard, a specific failure domain key may be accessed by the selector 320 based on the input of the active failure domain 332 and provided to the encryption engine 304 when reading data from a writing data to a given failure domain within the storage device.

Figure 4:
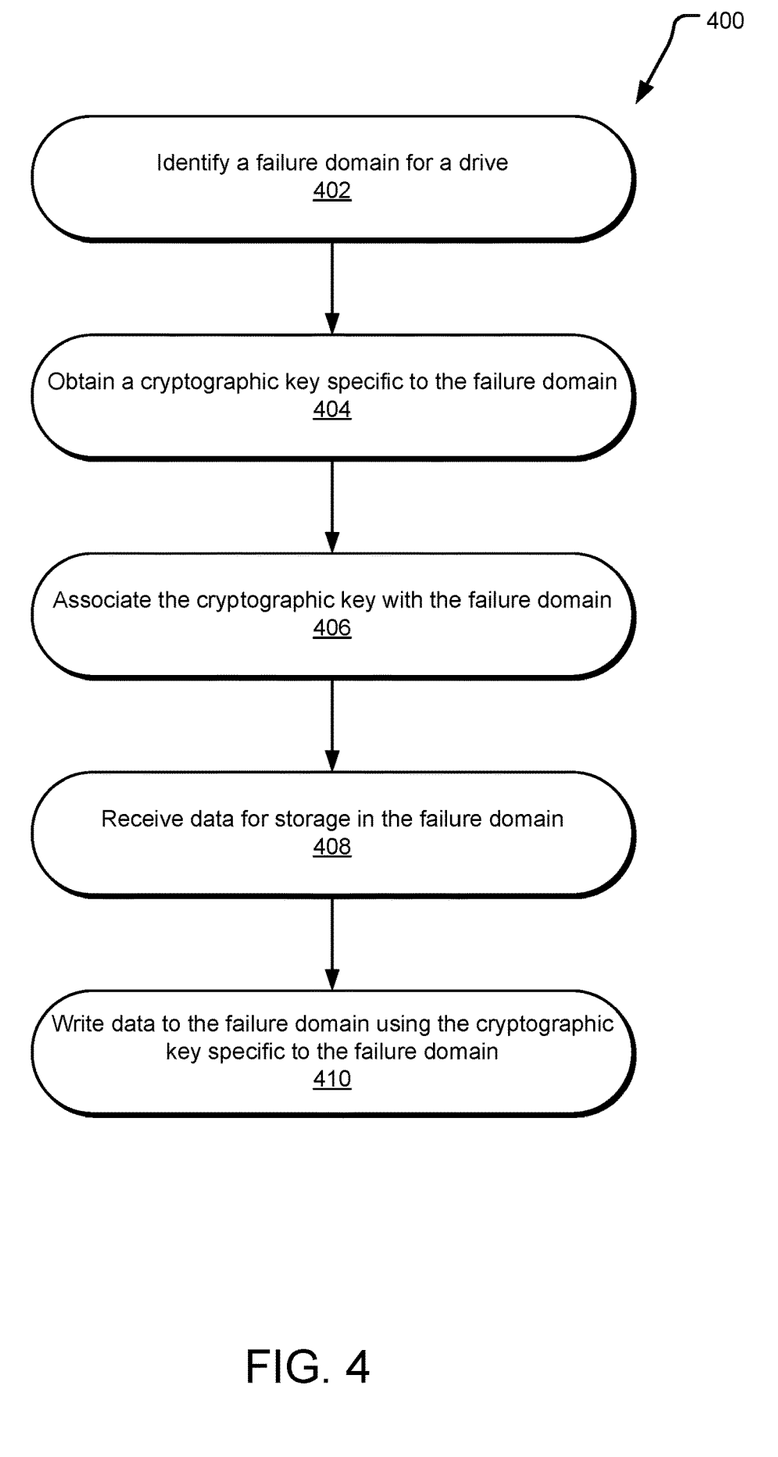
FIG. 4 illustrates example operations for storage of data in a storage drive using failure domain-specific cryptographic keys.

By providing failure domain-specific cryptographic keys that are used to store and retrieve data from the respective failure domains, the control of access to data in each failure domain may be individually controlled. Turning to FIG. 4, a plurality of example operations 400 are depicted corresponding to use of failure domain-specific cryptographic keys for writing data to a storage drive. The operations 400 including an identifying operation 402 in which a given failure domain for the drive is identified as being an active failure domain (e.g., a target failure domain to which data is to be written on the drive). The operations 400 further include an obtaining operation 404 in which a cryptographic key is obtained. An associating operation 406 may uniquely associate the obtained cryptographic key with the active failure domain such that the failure domain-specific cryptographic key is used exclusively for a given failure domain. In turn, a receiving operation 408 may receive data that is to be written to the storage drive in the identified failure domain. In turn, a writing operation 410 may be performed in which encrypted data is written to the failure domain using the cryptographic key specific to the failure domain. The failure domain-specific cryptographic key may be used in conjunction with one or more other cryptographic keys including, for example, one or more root keys or one or more active band keys.

Figure 5:
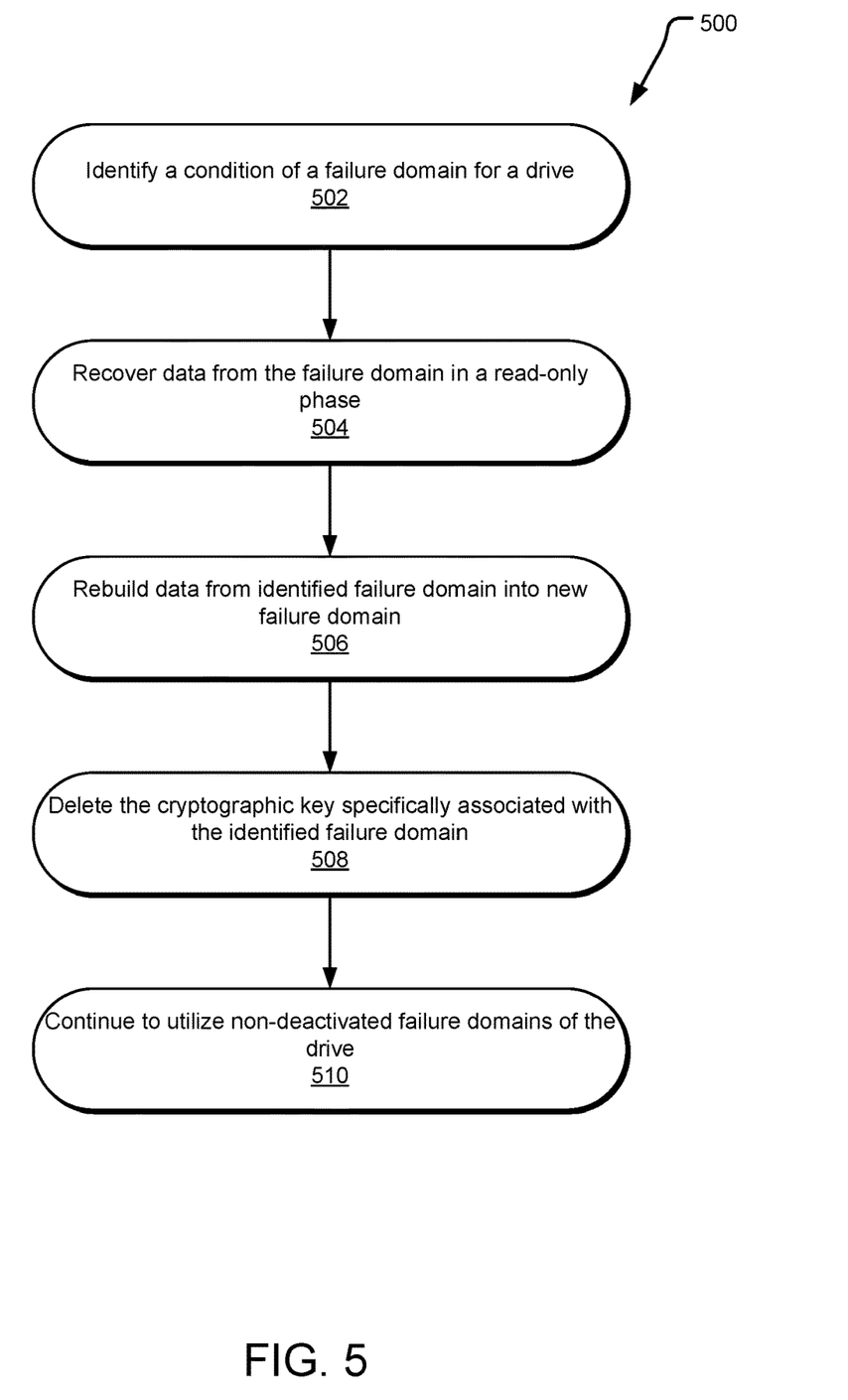
FIG. 5 illustrates example operations for a remanufacture process of a storage drive with a failure domain having a condition associated with failure with deletion of a cryptographic key for the failure domain upon completion of the remanufacture process.

FIG. 5 illustrates operations 500 that illustrate an example of use of failure domain-specific cryptographic keys to limit access to data within a given failure domain subsequent to a remanufacture operation. The operations 500 including an identifying operation 502 in which a condition of a failure domain of a storage drive is identified. The condition identified in the identifying operation 502 may relate to a failure or potential failure of a failure domain in the drive. For example, the condition may correspond to a failure of a given component within the failure domain such as a read head, a right head, an actuator, or other component that experiences a failure that prevents full functionality of the storage device within the failure domain. Alternatively or additionally, the condition may correspond to a predicted failure such that despite not having not yet failed, the condition indicates that a potential failure may occur within the failure domain such that a remanufacture process is advantageously performed preemptively in advance of actual failure of the failure domain.

In any regard, a recovering operation 504 may be performed in which data from the failure domain may be recovered using a read-only state of the identified failure domain. For example, in the event of a failure of a write head, the read head within the failure domain may still be operative to access and read data from the storage drive in the failure domain identified with the condition associated with failure. The operations 500 include a rebuilding operation 506 in which data from the identified failure domain may be rebuilt or moved into one or more new failure domains different from the identified failure domain. The one or more new failure domains into which data is rebuilt or moved may comprise different failure domains within the same storage drive of the identified failure domain. That is, data may be rebuilt or moved within a given drive for which a failure domain has been identified. Alternatively or additionally, the data may be rebuilt or moved to one or more failure domains of a different storage drive. For example, a host device in operative communication with a plurality of storage drives may perform the rebuilding operation 506 to rebuild/move data from a failure domain identified with a condition associated with failure in a first storage device into one or more different failure domains of a different storage drive.

The operations 500 may also include a deletion operation 508 in which the cryptographic key specifically associated with the identified failure domain that has failed or is predicted to fail may be deleted. By deleting the cryptographic key specific to the identified failure domain, any remaining data in the identified failure domain may be no longer accessible because the data in that identified failure domain was encrypted using the cryptographic key that is deleted. As such, upon deletion of the cryptographic key specific to the identified failure domain, the data may no longer be accessible even if some components of the identified failure domain may still be capable of accessing the data (e.g., the read head is still functional to read data from the storage media of the identified failure domain). In turn, the operations 500 may include a utilization operation 510 in which the failure domains of the drive other than the identified failure domain for which the cryptographic key is deleted may continue to be utilized for normal operation. Thus, the operations 500 may represent a remanufacturing operation (e.g., a data-safe or on-line remanufacturing operation) in which a portion of a storage device corresponding to an identified failure domain may be decommissioned such that the cryptographic key uniquely associated with the decommissioned failure domain is deleted and any data resident in the failure domain is no longer be accessible subsequent to the rebuild and deletion of the cryptographic key for the identified failure domain.

Figure 6:
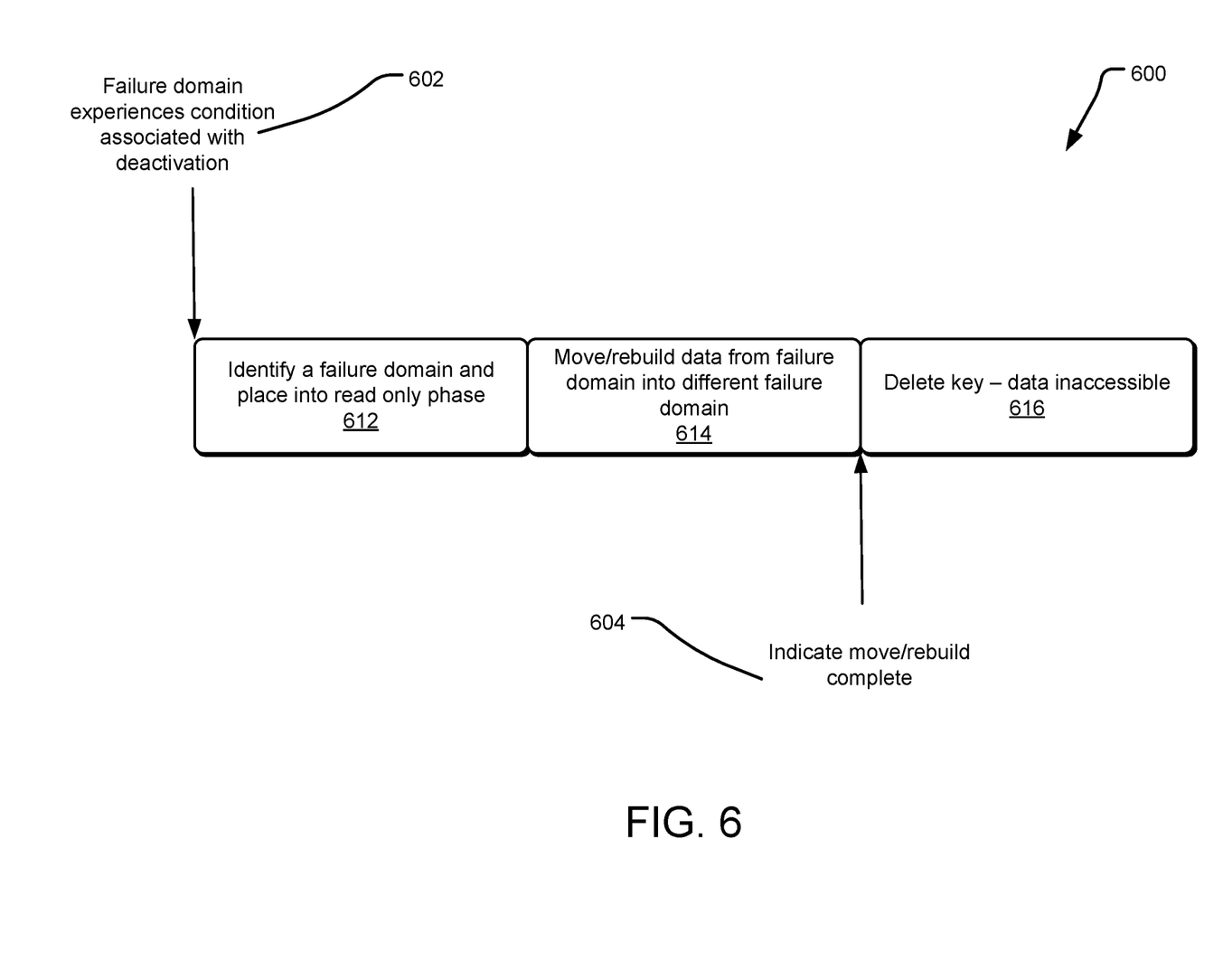
FIG. 6 illustrates example phases of a storage drive undergoing the remanufacture process of FIG. 5.

FIG. 6 illustrates example phases 600 corresponding to the operations 500 shown in FIG. 5 including inputs from a host or other controller to a storage device. The phases 600 may represent chronologic operation moving from left to right in FIG. 6. In this regard, an input 602 providing an indication of a condition associated with a failure domain may be received. In turn, the drive may initiate an identification phase 612 in which the identified failure domain is placed into a read-only state. In a subsequent rebuilding phase 614, data from the failure domain may be moved or rebuilt into a different failure domain as described above. An input 604 indicating that the rebuild process is complete may be received at which time the drive may initiate a decommissioning phase 616 in which the cryptographic key for the identified failure domain is deleted such that the data within the identified file domain is no longer accessible.

In another approach, after a depopulation event, the host or storage drive could generate a new set of host keys to rebuild the storage drive on top of the same bands, while keeping the old keys active and enabled for the read-only surface. Once the drive is rebuilt, the old key can be deleted. This has the benefit of not requiring as many physical keys, but it may include indicating which of a set of host keys is active. Also, the host must rewrite all the data on the media which is read-write before deleting the old keys for the bad surface, although this does allow both old and new data live at the same time, without having to reformat or forcing the host to write temporary data in order to manage the banding.

Figure 7:
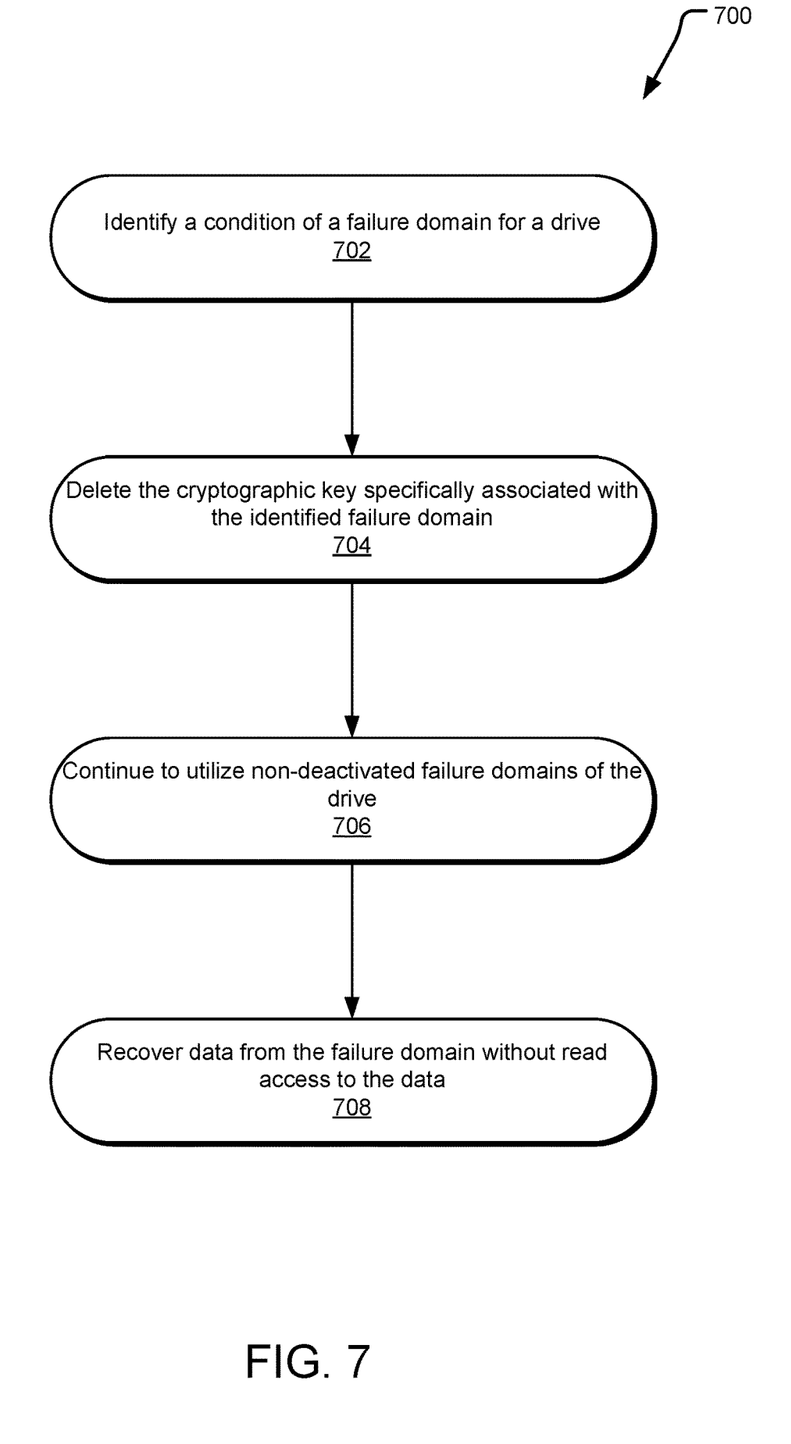
FIG. 7 illustrates example operations for a remanufacture process of a storage drive with a failure domain having a condition associated with failure with deletion of a cryptographic key for the failure domain prior to reconstruction of the data from the failure domain.

FIG. 7 illustrates another set of example operations 700. The operations 700 include an identifying operation 702 in which a condition corresponding to a failure associated with a failure domains identified. As described above, the condition may be actual failure of the failure domain or a predicted failure of the failure domain. The operations 700 further include a deleting operation 704 in which the cryptographic key associated with identify failure domain is deleted. The operations 700 may also include a utilization operation 706 in which the other portions of the storage drive other than the identified failure are used in normal operation.

The operations 700 may include a recovering operation 708 in which data that was stored in the decommissioned failure domain may be recovered without access to the data. That is, the recovering operations 708 may occur subsequent to the deletion operation 704 such that access to the data in the failure domain is not available. In this regard, the operations 700 represent an example approach in which the cryptographic key specific to the failure domain is deleted upon identifying a condition associated with failure without an intermediate rebuilding operation using a read-only phase of the failure domain. Rather, data may be reconstructed (e.g., using parity data or the like) in a different failure domain without access to the data within the failure domain subsequent to deletion of the failure domain-specific cryptographic key. In other examples, the operations 700 may conclude at the utilizing operating 706 such that no rebuilding of data in the identified failure domain occurs. Even in these examples, deletion of the failure domain-specific key associated with the identified failure domain may preclude access to the data in the failure domain after the deletion operation 704.

Figure 8:
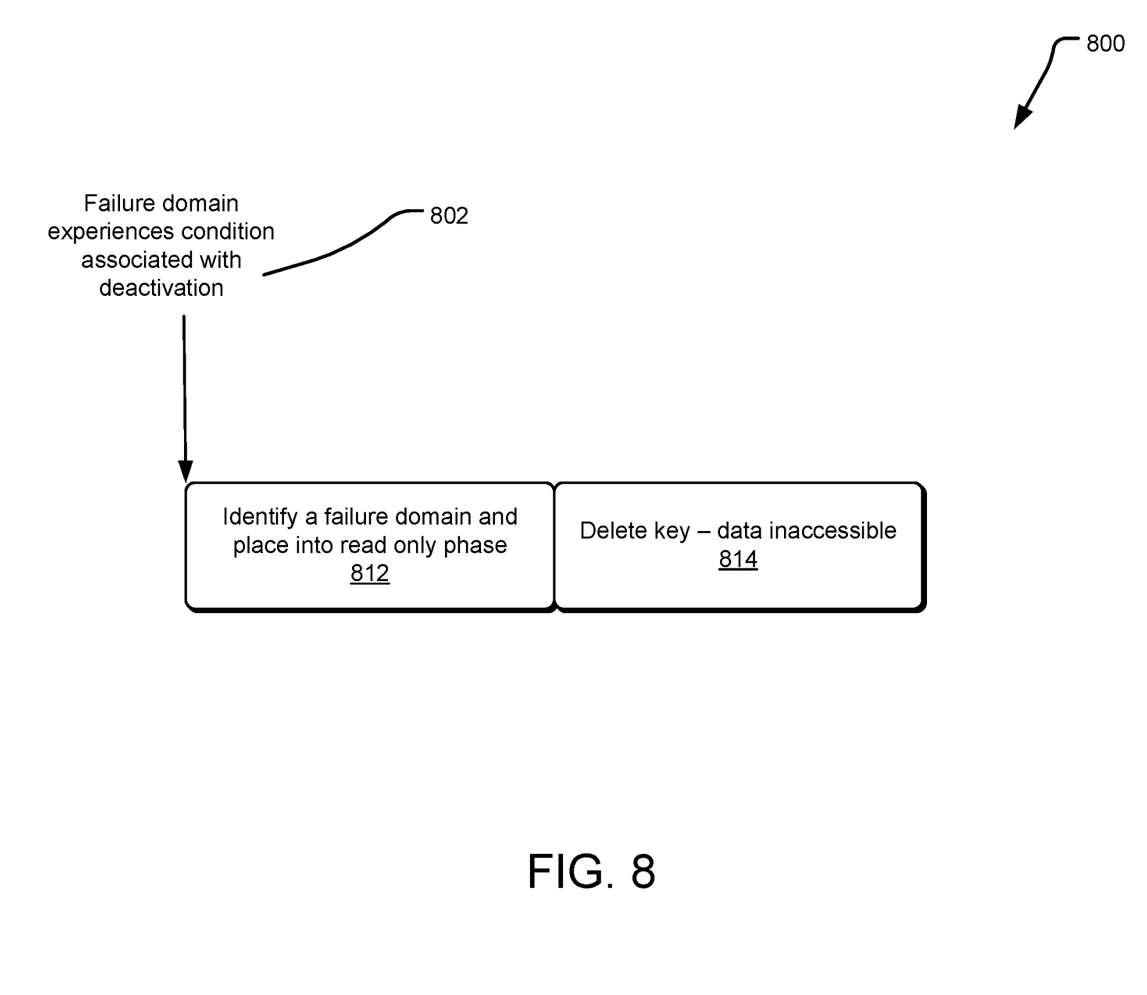
FIG. 8 illustrates example phases of a storage drive undergoing the remanufacture process of FIG. 7.

FIG. 8 depicts example phases 800 for the approach shown in FIG. 7. The phases 800 may represent chronologic operation moving from left to right in FIG. 8. In this regard, an input 802 corresponding to identification of a condition is provided. In turn, an identifying phase 812 commences in which the failure domain is identified. In turn, the key cryptographic corresponding to the identified failure domain is deleted in a deletion phase 814. The deletion phase 814 may commence without an intervening rebuild or move phase as illustrated in FIG. 6. While not shown, data from the failure domain may be reconstructed in a different failure domain subsequent to the deletion phase 814 using means for data reconstruction of the data within the failure domain by other means other than access to the data in the failure domain.

Figure 9:
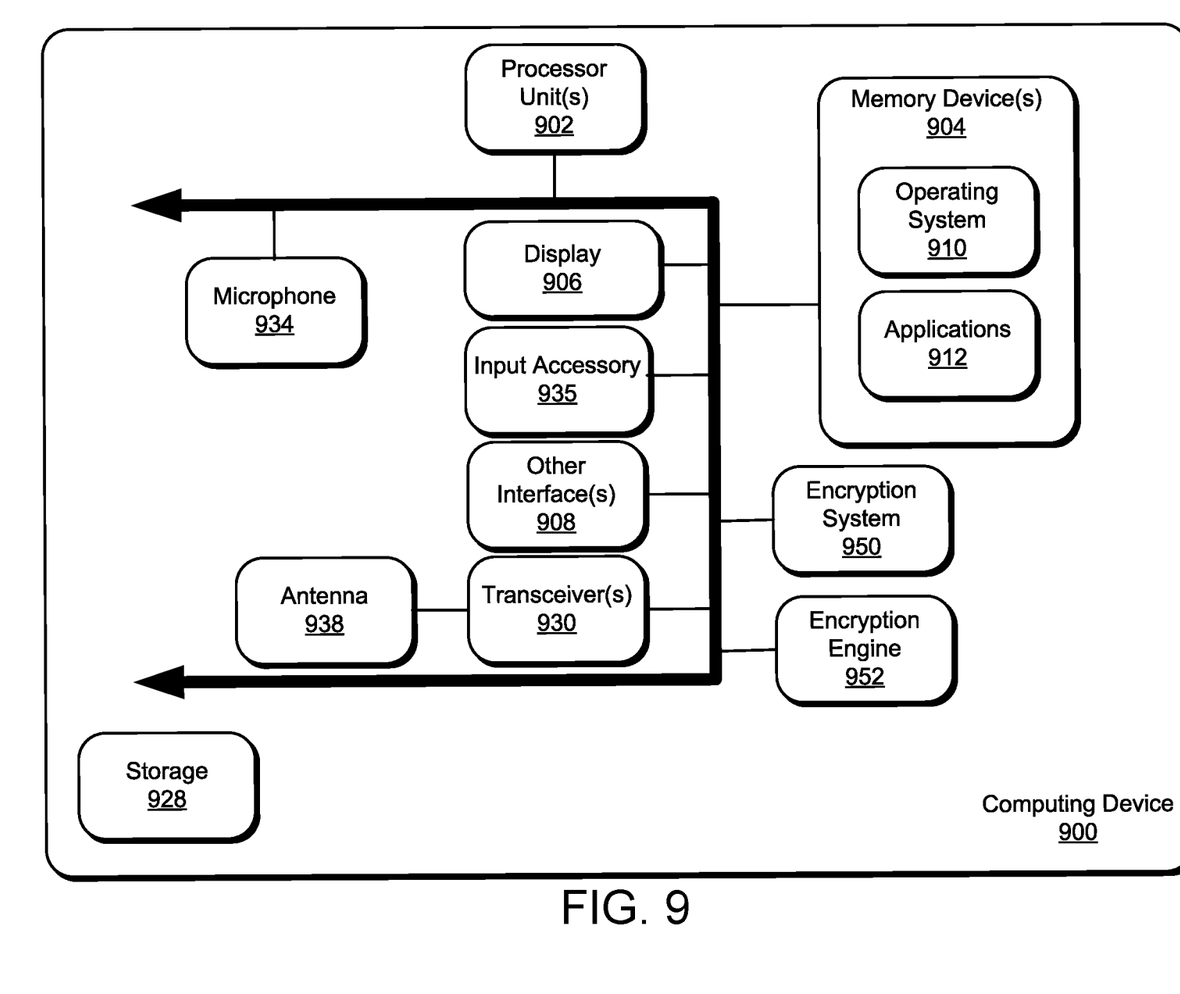
FIG. 9 illustrates an example computing device that may be used in connection with execution of the present disclosure.

FIG. 9 illustrates an example schematic of a computing device 900 suitable for implementing aspects of the disclosed technology including an encryption system 950 and/or an encryption engine 952 as described above. The computing device 900 includes one or more processor unit(s) 902, memory 904, a display 906, and other interfaces 908 (e.g., buttons). The memory 904 generally includes both volatile memory (e.g., RAM) and non-volatile memory (e.g., flash memory). An operating system 910, such as the Microsoft Windows® operating system, the Apple macOS operating system, or the Linux operating system, resides in the memory 904 and is executed by the processor unit(s) 902, although it should be understood that other operating systems may be employed.

One or more applications 912 are loaded in the memory 904 and executed on the operating system 910 by the processor unit(s) 902. Applications 912 may receive input from various input local devices such as a microphone 934, input accessory 935 (e.g., keypad, mouse, stylus, touchpad, joystick, instrument mounted input, or the like). Additionally, the applications 912 may receive input from one or more remote devices such as remotely-located smart devices by communicating with such devices over a wired or wireless network using more communication transceivers 930 and an antenna 938 to provide network connectivity (e.g., a mobile phone network, Wi-Fi®, Bluetooth®). The computing device 900 may also include various other components, such as a positioning system (e.g., a global positioning satellite transceiver), one or more accelerometers, one or more cameras, an audio interface (e.g., the microphone 934, an audio amplifier and speaker and/or audio jack), and storage devices 928. Other configurations may also be employed.

The computing device 900 further includes a power supply 916, which is powered by one or more batteries or other power sources and which provides power to other components of the computing device 900. The power supply 916 may also be connected to an external power source (not shown) that overrides or recharges the built-in batteries or other power sources.

In an example implementation, the computing device 900 comprises hardware and/or software embodied by instructions stored in the memory 904 and/or the storage devices 928 and processed by the processor unit(s) 902. The memory 904 may be the memory of a host device or of an accessory that couples to the host. Additionally or alternatively, the computing device 900 may comprise one or more field programmable gate arrays (FGPAs), application specific integrated circuits (ASIC), or other hardware/software/firmware capable of providing the functionality described herein.

The computing device 900 may include a variety of tangible processor-readable storage media and intangible processor-readable communication signals. Tangible processor-readable storage can be embodied by any available media that can be accessed by the computing device 900 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

One general aspect of the present disclosure includes a method for limiting access to data within a failure domain of a storage drive. The method includes associating a failure domain-specific cryptographic key with a failure domain of a storage drive and writing encrypted data to storage media comprising the failure domain using the failure domain-specific cryptographic key. The method also includes detecting a condition related to a failure of the storage drive within the failure domain. In turn, the method includes deleting the failure domain-specific cryptographic key to limit access to the encrypted data written to the storage media using the failure domain-specific cryptographic key.

Implementations may include one or more of the following features. For example, the failure domain may include to a portion of the storage drive serviced by a physical component susceptible to failure. In this regard, the physical component may include at least one of a storage media surface, a head, a shingled magnetic recording zone, or an actuator.

In an example, the method may further include maintaining the failure domain in a read-only state prior to deleting the failure domain-specific cryptographic key. The method may also include rebuilding data from the failure domain into other storage media different than the storage media of the failure domain. In turn, the deleting the failure domain-specific cryptographic key may occur after the rebuilding is complete. However, in other examples, data may be rebuilt after deletion of the failure domain-specific cryptographic key. In still further examples, the failure domain-specific cryptographic key may be deleted without rebuilding the data. However, in the examples in which data is rebuilt, the other storage media different than the storage media of the failure domain may include at least one of another failure domain of the storage drive or at least one failure domain of another storage drive.

In an example, the storage media may include a plurality of failure domains that each include a unique subset of storage media for the storage drive. Each of the plurality of failure domains may each have a uniquely associated failure domain-specific cryptographic key.

In an example, the condition related to a failure of the storage drive within the failure domain may relate to a predicted failure of the failure domain. In another example, the condition related to a failure of the storage drive within the failure domain may relate to an actual failure of the failure domain.

Another general aspect of the present disclosure includes a storage drive with failure domain-specific cryptographic keying. The storage drive includes a plurality of failure domains, each comprising storage media for persistent storage of data. The storage drive also comprises a key store comprising a plurality of failure domain-specific cryptographic keys. Each of the plurality of failure domain-specific cryptographic keys are uniquely associated with one of the plurality of failure domains. The storage drive also includes an encryption engine operative to access the key store to utilize a corresponding one of the plurality of failure domain-specific cryptographic keys to write encrypted data to the storage media of a failure domain. In turn, upon detection of a condition related to a failure of the storage drive within a failed failure domain, the failure domain-specific cryptographic key for the failed failure domain is deleted to limit access to the encrypted data written to the storage media using the failure domain-specific cryptographic key.

Implementations may include one or more of the following features. For example, the failure domain may include a portion of the storage drive serviced by a physical component susceptible to failure. The physical component may include at least one of a storage media surface, a head, a shingled magnetic recording zone, or an actuator.

In an example, the failed failure domain may be maintained in a read-only state prior to deleting the failure domain-specific cryptographic key. In turn, data may be rebuilt from the failed failure domain into other storage media different than the storage media of the failure domain. In this example, deleting the failure domain-specific cryptographic key may occur after the data has been rebuilt. In other examples, the failure domain-specific cryptographic key may be deleted prior to rebuilding data from the identified failure domain, or the data may not be rebuilt at all. In examples in which the data is rebuilt, the other storage media different than the storage media of the failure domain may include at least one of another failure domain of the storage drive or at least one failure domain of another storage drive.

In an example, the storage media comprises a plurality of failure domains each comprising a unique subset of storage media for the storage drive. Each of the plurality of failure domains may each have a uniquely associated failure domain-specific cryptographic key in the key store.

In an example, the condition related to a failure of the storage drive within the failure domain may relate to a predicted failure of the failure domain. In another example, the condition related to a failure of the storage drive within the failure domain may relate to an actual failure of the failure domain.

Another general aspect of the present disclosure includes one or more tangible processor-readable storage media embodied with instructions for executing on one or more processors and circuits of a device a process for limiting access to data within a failure domain of a storage drive. The process includes associating a failure domain-specific cryptographic key with a failure domain of a storage drive and writing encrypted data to storage media comprising the failure domain using the failure domain-specific cryptographic key. The process also includes detecting a condition related to a failure of the storage drive within the failure domain. In turn, the process includes deleting the failure domain-specific cryptographic key to limit access to the encrypted data written to the storage media using the failure domain-specific cryptographic key.

Implementations may include one or more of the following features. For example, the process may include maintaining the failure domain in a read-only state prior to deleting the failure domain-specific cryptographic key. The process may also include rebuilding data from the failure domain into other storage media different than the storage media of the failure domain. The deleting the failure domain-specific cryptographic key may occur after the rebuilding is complete. However, in other examples, data may be rebuilt after deletion of the failure domain-specific cryptographic key. In still further examples, the failure domain-specific cryptographic key may be deleted without rebuilding the data. However, in the examples in which data is rebuilt, the other storage media different than the storage media of the failure domain may include at least one of another failure domain of the storage drive or at least one failure domain of another storage drive.

In an example, the condition related to a failure of the storage drive within the failure domain may relate to at least one of a predicted failure of the failure domain or an actual failure of the failure domain.

In an example, the storage media may include a plurality of failure domains that may each have a unique subset of storage media for the storage drive. Each of the plurality of failure domains may each have a uniquely associated failure domain-specific cryptographic key.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method for limiting access to data within a failure domain of a storage drive, the method comprising:
    associating a failure domain-specific cryptographic key with a failure domain of a storage drive, wherein the failure domain comprises a portion of, but not all, storage resources in the storage drive, and wherein the failure domain is one of a plurality of failure domains of the storage drive that each has a uniquely associated failure domain-specific cryptographic key;
    writing encrypted data to storage media comprising the failure domain using the failure domain-specific cryptographic key;
    detecting a condition related to a failure of the storage drive within the failure domain associated with the failure-domain specific cryptographic key; and
    deleting the failure domain-specific cryptographic key to limit access to the encrypted data written to the storage media in the failure domain using the failure domain-specific cryptographic key, wherein others of the plurality of failure domains are unaffected.

2. The method of claim 1, wherein the failure domain corresponds to a portion of the storage drive serviced by a physical component susceptible to failure.

3. The method of claim 2, wherein the physical component comprises at least one of a storage media surface, a head, a shingled magnetic recording zone, or an actuator.

4. The method of claim 1, further comprising:
    prior to deleting the failure domain-specific cryptographic key, maintaining the failure domain in a read-only state;
    rebuilding data from the failure domain into other storage media different than the storage media of the failure domain; and
    wherein the deleting the failure domain-specific cryptographic key occurs after the rebuilding is complete.

5. The method of claim 4, wherein the other storage media different than the storage media of the failure domain comprises at least one of another failure domain of the plurality of failure domains of the storage drive or at least one failure domain of another storage drive.

6. The method of claim 1, wherein the plurality of failure domains each comprise a unique subset of storage media for the storage drive.

7. The method of claim 1, wherein the condition related to a failure of the storage drive within the failure domain corresponds to a predicted failure of the failure domain.

8. The method of claim 1, wherein the condition related to a failure of the storage drive within the failure domain corresponds to an actual failure of the failure domain.

9. A storage drive with failure domain-specific cryptographic keying, comprising:
   a plurality of failure domains, each of the plurality of failure domains comprising storage media for persistent storage of data comprising a portion of, but not all, storage resources of the storage drive;
   a key store comprising a plurality of failure domain-specific cryptographic keys, each of the plurality of failure domain-specific cryptographic keys being uniquely associated with one of the plurality of failure domains;
   an encryption engine operative to access the key store to utilize a corresponding one of the plurality of failure domain-specific cryptographic keys to write encrypted data to the storage media of a failure domain; and
   wherein, upon detection of a condition related to a failure of the storage drive within a failed failure domain associated with a given failure domain-specific cryptographic key, the given failure domain-specific cryptographic key for the failed failure domain is deleted to limit access to the encrypted data written to the storage media in the failed failure domain using the given failure domain-specific cryptographic key, wherein others of the plurality of failure domains are unaffected.

10. The storage drive of claim 9, wherein each one of the plurality of failure domains corresponds to a portion of the storage drive serviced by a physical component susceptible to failure.

11. The storage drive of claim 10, wherein the physical component comprises at least one of a storage media surface, a head, a shingled magnetic recording zone, or an actuator.

12. The storage drive of claim 9, wherein prior to deleting the failure domain-specific cryptographic key, the failed failure domain is maintained in a read-only state and data is rebuilt from the failed failure domain into other storage media different than the storage media of the failure domain, wherein the deleting the failure domain-specific cryptographic key occurs after the data has been rebuilt.

13. The storage drive of claim 12, wherein the other storage media different than the storage media of the failure domain comprises at least one of another failure domain of the plurality of failure domains of the storage drive or at least one failure domain of another storage drive.

14. The storage drive of claim 9, wherein the plurality of failure domains each comprising a unique subset of storage media for the storage drive.

15. The storage drive of claim 9, wherein the condition related to a failure of the storage drive within the failure domain corresponds to a predicted failure of the failure domain.

16. The storage drive of claim 9, wherein the condition related to a failure of the storage drive within the failure domain corresponds to an actual failure of the failure domain.

17. One or more non-transitory processor-readable storage media embodied with instructions for executing on one or more processors and circuits of a device a process for limiting access to data within a failure domain of a storage drive, the process comprising:
   associating a failure domain-specific cryptographic key with a failure domain of a storage drive, wherein the failure domain comprises a portion of, but not all, storage resources in the storage drive, and wherein the failure domain is one of a plurality of failure domains of the storage drive that each has a uniquely associated failure domain-specific cryptographic key;
   writing encrypted data to storage media comprising the failure domain using the failure domain-specific cryptographic key;
   detecting a condition related to a failure of the storage drive within the failure domain associated with the failure-domain specific cryptographic key; and
   deleting the failure domain-specific cryptographic key to limit access to the encrypted data written to the storage media in the failure domain using the failure domain-specific cryptographic key, wherein others of the plurality of failure domains are unaffected.

18. The one or more non-transitory processor-readable storage media of claim 17, the process further comprising:
   prior to deleting the failure domain-specific cryptographic key, maintaining the failure domain in a read-only state;
   rebuilding data from the failure domain into other storage media different than the storage media of the failure domain; and
   wherein the deleting the failure domain-specific cryptographic key occurs after the rebuilding is complete.

19. The one or more non-transitory processor-readable storage media of claim 17, wherein the condition related to a failure of the storage drive within the failure domain corresponds to at least one of a predicted failure of the failure domain or an actual failure of the failure domain.

20. The one or more non-transitory processor-readable storage media of claim 17, wherein the plurality of failure domains each comprise a unique subset of storage media for the storage drive.

* * * * *